W. T. HUNTINGTON, OF WASHINGTON, DISTRICT OF COLUMBIA.

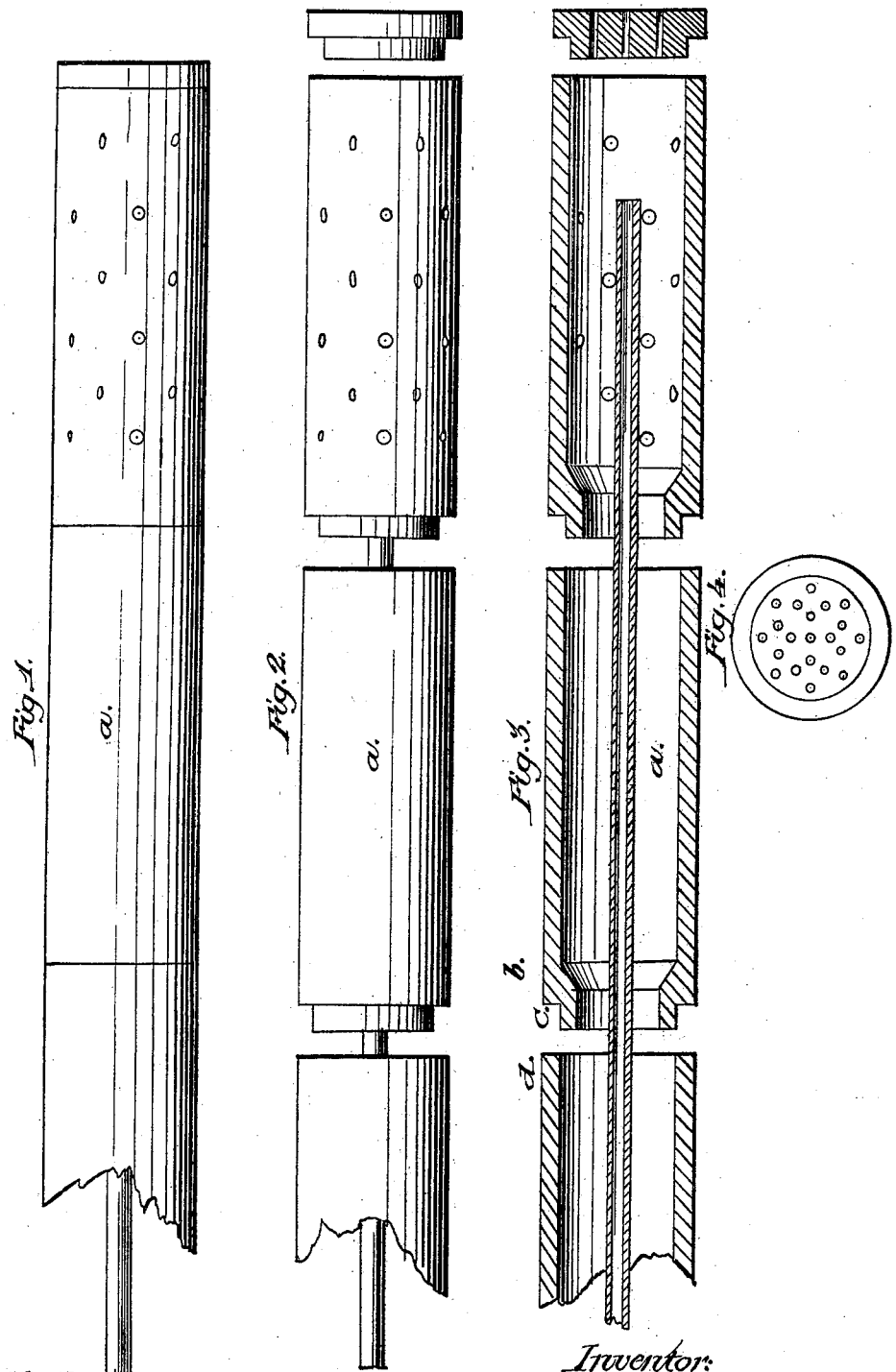

Letters Patent No. 87,172, dated February 23, 1869.

IMPROVEMENT IN WELL-CURBING.

The Schedule referred to in these Letters Patent and making part of the same.

*To all whom it may concern:*

Be it known that I, W. T. HUNTINGTON, of the city of Washington, in the District of Columbia, have invented a new and improved Mode of Curbing Artesian Wells; and do hereby declare that the following is a full and exact description thereof, reference being had to the annexed drawings, making a part of this specification.

No. 1 is a plan view of the column of curbing, with sections connected.

No. 2 is a view of curbing in sections, showing the manner of connecting the sections.

No. 3 is a sectional view, showing the pipe descending from pump to water.

No. 4 is a representation of bed-plate, upon which the entire column rests.

This invention relates, primarily, to the provision of curbs for wells, constructed as specified in my patent for an "earth-boring instrument," dated January 12, 1869, and numbered 85,741, and consists, not in the formation of a curb of a succession of cylinders, nor in the material of which the cylinders are formed, as metal and earthenware have often been used for analogous purposes, but it consists in the curb as formed, possessing the properties and characteristics hereinafter described.

The presence of wood in a well is always objectionable. The decay of the substance is always progressing.

It is often convenient to make and use pump-stocks formed of wood, but these are susceptible of removal and renewal at will.

The removal and renewal of a partially-decayed curb is exceedingly difficult, if not impossible.

Bricks have been used for the purpose, and may be of such quality, and so laid with good cement as to prove satisfactory. But bricks cannot be used in very narrow wells.

The object, therefore, is to furnish curbs superior in quality to brick curbs, and as facile in their original application as curbs of wood.

To this end, I construct the cylindrical curbing in sections, $a$, of convenient length, and of any required diameter, contracting the diameter of each section at one end, $b$, so as to form a shoulder, and admit the adjoining section to pass over and rest on the shoulder formed by such contraction.

I use, in the construction of the curbing, the appropriate kind of clay, hardened in the kiln or oven, after being moulded or pressed into the required form, when in a plastic state, and also the appropriate materials for cement, which is formed as required, when in a plastic state, and hardened by atmospheric exposure.

What I claim, and desire to secure by Letters Patent, is—

A well-curb, made of plastic material, formed and hardened into cylinders, adapted at their ends for joining to each other, the lowest section perforated at or near the lower end, all substantially as described.

W. T. HUNTINGTON.

Witnesses:
WILLIAM WUERZ,
WM. B. GOOD.